US009385621B2

(12) United States Patent
Kost et al.

(10) Patent No.: US 9,385,621 B2
(45) Date of Patent: Jul. 5, 2016

(54) STABILIZATION CIRCUIT FOR LOW-VOLTAGE LIGHTING

(71) Applicant: KONINKLIJKE PHILIPS N.V., Eindhoven (NL)

(72) Inventors: Michael A. Kost, Austin, TX (US); Eric J. King, Dripping Springs, TX (US); John L. Melanson, Austin, TX (US); Kan Wang, Austin, TX (US); Ramin Zanbaghi, Austin, TX (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 14/276,535

(22) Filed: May 13, 2014

(65) Prior Publication Data
US 2014/0333205 A1  Nov. 13, 2014

Related U.S. Application Data

(60) Provisional application No. 61/822,673, filed on May 13, 2013.

(51) Int. Cl.
*H05B 33/08* (2006.01)
*H02M 5/458* (2006.01)

(52) U.S. Cl.
CPC ........... *H02M 5/458* (2013.01); *H05B 33/0815* (2013.01); *H05B 33/0887* (2013.01)

(58) Field of Classification Search
USPC ........... 315/291, 224, 307, 247, 297; 363/126
See application file for complete search history.

(56) References Cited

U.S. PATENT DOCUMENTS

| 3,806,829 A | 4/1974 | Duston et al. |
| 4,008,414 A | 2/1977 | Agnew |

(Continued)

FOREIGN PATENT DOCUMENTS

| EP | 2590477 A1 | 5/2013 |
| WO | 2011063205 A1 | 5/2011 |

(Continued)

OTHER PUBLICATIONS

International Search Report and Written Opinion, International Patent Application No. PCT/US2013/071690, mailed Jun. 4, 2014, 13 pages.

(Continued)

*Primary Examiner* — Douglas W Owens
*Assistant Examiner* — Syed M Kaiser

(57) ABSTRACT

An electronic transformer stabilization circuit includes a detection circuit and a reactive load. The detection circuit may be configured to receive a transformer output or a transformer signal derived from the transformer output. The detection circuit may determine whether the transformer that generated the transformer output is an electronic transformer. The determination may be made based on the presence of absence of high frequency components in the transformer output. Responsive to determining that an electronic transformer generated the transformer output, the stabilization circuit may operate a switch to connect the reactive load across an output of the transformer. The reactive load may include an inductor and may be configured to draw a stabilization current from the transformer. The stabilization current may ensure that the total current drawn from the transformer exceeds an oscillation current required to maintain reliable operation of the electronic transformer.

22 Claims, 9 Drawing Sheets

126

(56) References Cited

U.S. PATENT DOCUMENTS

| | | | | |
|---|---|---|---|---|
| 4,562,382 A * | 12/1985 | Elliott | | 315/219 |
| 5,040,236 A * | 8/1991 | Costello | | 392/417 |
| 5,089,753 A | 2/1992 | Mattas | | |
| 5,416,387 A * | 5/1995 | Cuk et al. | | 315/209 R |
| 5,583,402 A | 12/1996 | Moisin et al. | | |
| 5,650,694 A | 7/1997 | Jayaraman et al. | | |
| 5,872,429 A | 2/1999 | Xia et al. | | |
| 6,369,461 B1 | 4/2002 | Jungreis et al. | | |
| 6,407,935 B1 * | 6/2002 | Chang et al. | | 363/34 |
| 7,812,550 B2 | 10/2010 | Harmgardt et al. | | |
| 8,067,902 B2 | 11/2011 | Newman, Jr. et al. | | |
| 8,212,491 B2 | 7/2012 | Kost et al. | | |
| 8,547,034 B2 * | 10/2013 | Melanson et al. | | 315/247 |
| 8,653,759 B2 | 2/2014 | Vigh et al. | | |
| 8,664,883 B2 | 3/2014 | Hiramatu et al. | | |
| 8,716,957 B2 | 5/2014 | Melanson et al. | | |
| 8,723,431 B2 | 5/2014 | Deppe et al. | | |
| 8,742,674 B2 | 6/2014 | Shteynberg et al. | | |
| 8,928,243 B2 | 1/2015 | Potter et al. | | |
| 8,933,648 B1 | 1/2015 | Putman et al. | | |
| 9,072,125 B2 | 6/2015 | King et al. | | |
| 2003/0127994 A1 | 7/2003 | Patchornik et al. | | |
| 2003/0151931 A1 * | 8/2003 | Kohno | | 363/22 |
| 2005/0174162 A1 | 8/2005 | Cheng et al. | | |
| 2005/0249667 A1 | 11/2005 | Tuszynski et al. | | |
| 2006/0147371 A1 | 7/2006 | Tuszynski et al. | | |
| 2007/0040516 A1 | 2/2007 | Chen | | |
| 2007/0076459 A1 * | 4/2007 | Limpkin | | 363/157 |
| 2007/0262654 A1 | 11/2007 | Mosebrook et al. | | |
| 2007/0285028 A1 | 12/2007 | Tsinker et al. | | |
| 2008/0013343 A1 | 1/2008 | Matthews | | |
| 2008/0018261 A1 | 1/2008 | Kastner | | |
| 2008/0024074 A1 | 1/2008 | Mosebrook et al. | | |
| 2008/0119421 A1 | 5/2008 | Tuszynski et al. | | |
| 2008/0224636 A1 | 9/2008 | Melanson | | |
| 2009/0184662 A1 | 7/2009 | Given et al. | | |
| 2009/0295292 A1 | 12/2009 | Harmgardt et al. | | |
| 2010/0013409 A1 * | 1/2010 | Quek et al. | | 315/294 |
| 2010/0141178 A1 | 6/2010 | Negrete et al. | | |
| 2010/0164406 A1 * | 7/2010 | Kost et al. | | 315/307 |
| 2010/0225251 A1 | 9/2010 | Maruyama | | |
| 2010/0244726 A1 * | 9/2010 | Melanson | | 315/291 |
| 2011/0012530 A1 | 1/2011 | Zheng et al. | | |
| 2011/0115400 A1 | 5/2011 | Harrison et al. | | |
| 2011/0121751 A1 | 5/2011 | Harrison et al. | | |
| 2011/0121752 A1 | 5/2011 | Newman, Jr. et al. | | |
| 2011/0121754 A1 | 5/2011 | Shteynberg et al. | | |
| 2011/0127925 A1 | 6/2011 | Huang et al. | | |
| 2011/0199017 A1 | 8/2011 | Dilger | | |
| 2011/0210674 A1 | 9/2011 | Melanson | | |
| 2011/0266968 A1 * | 11/2011 | Bordin et al. | | 315/287 |
| 2011/0309759 A1 | 12/2011 | Shteynberg et al. | | |
| 2012/0025729 A1 | 2/2012 | Melanson et al. | | |
| 2012/0043913 A1 | 2/2012 | Melanson | | |
| 2012/0049752 A1 | 3/2012 | King et al. | | |
| 2012/0098454 A1 | 4/2012 | Grotkowski et al. | | |
| 2012/0106216 A1 | 5/2012 | Tzinker et al. | | |
| 2012/0112638 A1 | 5/2012 | Melanson et al. | | |
| 2012/0112648 A1 | 5/2012 | Hariharan | | |
| 2012/0119669 A1 | 5/2012 | Melanson et al. | | |
| 2012/0139431 A1 | 6/2012 | Thompson | | |
| 2012/0146546 A1 * | 6/2012 | Hu et al. | | 315/297 |
| 2012/0169240 A1 * | 7/2012 | Macfarlane | | 315/152 |
| 2012/0229041 A1 | 9/2012 | Saes et al. | | |
| 2012/0230073 A1 * | 9/2012 | Newman et al. | | 363/126 |
| 2012/0242238 A1 | 9/2012 | Chen et al. | | |
| 2012/0286684 A1 | 11/2012 | Melanson et al. | | |
| 2012/0286696 A1 * | 11/2012 | Ghanem | | 315/291 |
| 2012/0286826 A1 | 11/2012 | King et al. | | |
| 2012/0299501 A1 | 11/2012 | Kost et al. | | |
| 2013/0002163 A1 | 1/2013 | He et al. | | |
| 2013/0113458 A1 | 5/2013 | Riesebosch | | |
| 2013/0278159 A1 | 10/2013 | Del Carmen, Jr. et al. | | |
| 2014/0009078 A1 | 1/2014 | Xie et al. | | |
| 2014/0009079 A1 | 1/2014 | Xie et al. | | |
| 2014/0009082 A1 * | 1/2014 | King et al. | | 315/247 |
| 2014/0028214 A1 | 1/2014 | Mazumdar et al. | | |
| 2014/0167639 A1 | 6/2014 | King et al. | | |
| 2014/0167652 A1 | 6/2014 | King et al. | | |
| 2014/0239832 A1 | 8/2014 | Shteynberg et al. | | |
| 2014/0333205 A1 * | 11/2014 | Kost et al. | | 315/127 |
| 2015/0061536 A1 | 3/2015 | Xie et al. | | |

FOREIGN PATENT DOCUMENTS

| | | |
|---|---|---|
| WO | 2011111005 A1 | 9/2011 |
| WO | 2013090904 A1 | 6/2013 |

OTHER PUBLICATIONS

International Search Report and Written Opinion, International Patent Application No. PCT/US2013/047777, mailed Jun. 26, 2014, 21 pages.

International Search Report and Written Opinion, International Patent Application No. PCT/US2013/047844, mailed Jul. 23, 2014, 14 pages.

International Search Report and Written Opinion, International Patent Application No. PCT/US2014/032182, mailed Jul. 24, 2014, 10 pages.

International Search Report and Written Opinion, International Patent Application No. PCT/US2014/037864, mailed Sep. 29, 2014, 8 pages.

* cited by examiner

STABILIZATION CIRCUIT FOR LOW-VOLTAGE LIGHTING

RELATED APPLICATIONS

This application claims priority to U.S. Provisional Patent Application No. 61/822,673, filed May 13, 2013, which is incorporated by reference herein in its entirety.

FIELD OF DISCLOSURE

The present disclosure relates in general to the field of lighting and, more specifically, to low-voltage lighting systems employing a transformer to generate a low-voltage supply signal and a low-voltage light bulb or lamp.

BACKGROUND

Low-voltage lighting systems encompass lighting systems and components suitable for use with a low-voltage supply signal. In the context of consumer and commercial lighting systems, "low-voltage" may refer to voltages with an average value of 40 V or less including 12 V systems and lamps. Low-voltage systems generally couple a conventional mains voltage, e.g., 120 V/60 Hz or 230 V/50 Hz, to a low-voltage lamp. The low-voltage system typically includes a transformer to generate the low-voltage supply signal from the mains voltage or from a dimmer connected to the mains voltage. Transformers for use in low-voltage lighting systems include two predominant types of transformers, magnetic transformers and electronic transformers. Although both types of transformers are capable of generating relatively stable supply signals, differences between the two types of transformers may raise compatibility issues. For example, a conventional low-voltage, light emitting diode (LED) lamp may perform better in a system that uses a magnetic transformer than a system that uses an electronic transformer.

SUMMARY

Subject matter disclosed herein addresses and beneficially reduces or eliminates at least some transformer-dependent performance and compatibility issues of at least some low-voltage lighting systems and low-voltage lamps including, without limitation, low-voltage LED lamps.

Disclosed subject matter encompasses embodiments directed to a stabilization apparatus, device, or circuit suitable for use with a low-voltage lamp. The stabilization apparatus may re-configure or modify the low-voltage lamp in accordance with an indication of the type of transformer providing a low-voltage supply to the lamp. In at least one embodiment, the stabilization apparatus may include a selectable load and a detection circuit. In at least one embodiment, the selectable load is a reactive load configurable to draw current from the transformer and the detection circuit may be configured to monitor the transformer output or another transformer signal indicative of the transformer output. Upon detecting a predetermined condition, the detection circuit may couple the reactive load to the transformer output.

In some embodiments, the apparatus may include one or more additional components including, as non-limiting examples, a rectifier, a driver, and an output load. The rectifier, which may include a diode bridge, is configured to generate a rectified signal from the transformer output. The driver may be configured to generate a load signal for driving the output load. The output load may comprise a light-producing load including one or more light-producing elements. The light-producing elements or lamps may include, without limitation, one or more low-voltage LED lamps, each of which may include one or more LEDs.

The predetermined condition that triggers the detection circuit to couple the reactive load to the transformer output may be a condition indicative of whether the transformer is an electronic transformer. In these embodiments, the reactive load may be coupled to the transformer when the detection circuit determines that the transformer is an electronic transformer or, more specifically in some embodiments, an electronic transformer that includes a self-oscillating circuit. In these embodiments, the reactive load may be configured to draw a minimum peak current needed to maintain self-oscillation of the electronic transformer. Because signals produced by electronic transformers generally include high frequency components, the detection circuit may include a high pass filter or any other circuit suitable for distinguishing a high frequency component in a signal and the predetermined condition may be the presence of a high frequency component in the transformer output signal, e.g., the presence of a component having a frequency exceeding 10 kHz, 20 kHz, or another specified threshold frequency or the presence of a component having a frequency in the 10 kHz to 100 kHz frequency band or another suitable frequency band.

In at least one embodiment, a high pass filter in the detection circuit includes a comparator configured to receive a reference voltage on a first input and a transformer output signal or a signal representative of the transformer output signal, e.g., the transformer output signal as recited by a rectifier, on a second input. The reactive load may include an inductor and a switch configured, when closed, to couple the inductor across the transformer output. In at least one embodiment, the stabilization circuit is integrated within the low-voltage lamp and the inductor and the switch are connected in series across input terminals of the low-voltage lamp.

The switch may be controlled by the detection circuit and implemented as a semiconductor switch, such as a metal oxide semiconductor (MOS) transistor, a bipolar transistor, or an opto-coupled switch. In these embodiments, a detection signal output by the detection circuit is provided to a control terminal of the switch. In opto-coupled switch embodiments, the switch may include an LED and an optically activated triac in proximity to the LED and the detection circuit output may drive the LED.

In embodiments that include a rectifier, the detection circuit may be located between the transformer and the rectifier, i.e., the detection circuit monitors an unrectified transformer output signal. In other embodiments, the detection circuit is located between the rectifier and the load circuit, i.e., the detection circuit monitors a rectified transformer output signal.

Disclosed subject matter further encompasses embodiments directed to a low-voltage lighting method that provides compatibility between low-voltage generation components including a step down transformer and low-voltage load components including a transformer-agnostic low-voltage lamp. In at least one embodiment, a disclosed low-voltage lighting method includes monitoring an output of a transformer for a characteristic indicative of an output generated by an electronic transformer. The method may further include responding to detection of the characteristic by coupling a reactive load in parallel with the transformer output and responding to detecting an absence or lack of the characteristic by decoupling the reactive load from the transformer output.

In this manner, the reactive load is available to draw current from the transformer in addition to the transformer current that is dissipated in the load output when the transformer is an electronic transformer. The reactive load may draw sufficient current from the transformer to sustain operation of a self-oscillating circuit in the transformer when the current consumed by the output load is, itself, insufficient to maintain self-oscillation of the transformer.

In some embodiments, the method includes determining whether the transformer output contains a frequency component with a frequency exceeding a specified threshold frequency, which may be approximately 20 kHz in one non-limiting example. The method may further include rectifying the transformer output signal, with a bridge rectifier, either before or after the signal is monitored for electronic transformer characteristic. Coupling the reactive load may include activating a semiconductor switch such as a transistor, an opto-coupled switch, or another switch coupled to the inductor.

Disclosed subject matter further compasses embodiments directed to a low-voltage lamp or apparatus that includes an inductor, a switch, and a detection circuit. The detection circuit may be configured to detect a transformer output signal generated by a step down transformer. The detection circuit may be configured to control the switch to connect the inductor across an output of the transformer in response to determining that the transformer is an electronic transformer. The detection circuit may further include a bridge rectifier. The detection circuit may be configured to monitor the transformer output as provided to the bridge rectifier or to monitor a rectified signal generated by the bridge rectifier. The detection circuit may activate the switch responsive to detecting a frequency component of the transformer output at a frequency exceeding a threshold frequency. The threshold frequency may be a frequency that would likely be generated by an electronic transformer and unlikely to be generated by a magnetic transformer.

The switch may be implemented with a bipolar or MOS transistor, with a light emitting diode in combination with an opto-coupled switch, or with another suitable switch mechanism.

Technical advantages of the present disclosure may be readily apparent to one of ordinary skill in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

As used herein, referring to two or more elements as being "coupled" to one another means that the two or more elements are in electronic communication whether connected indirectly or directly, with or without intervening elements.

Figure 1:
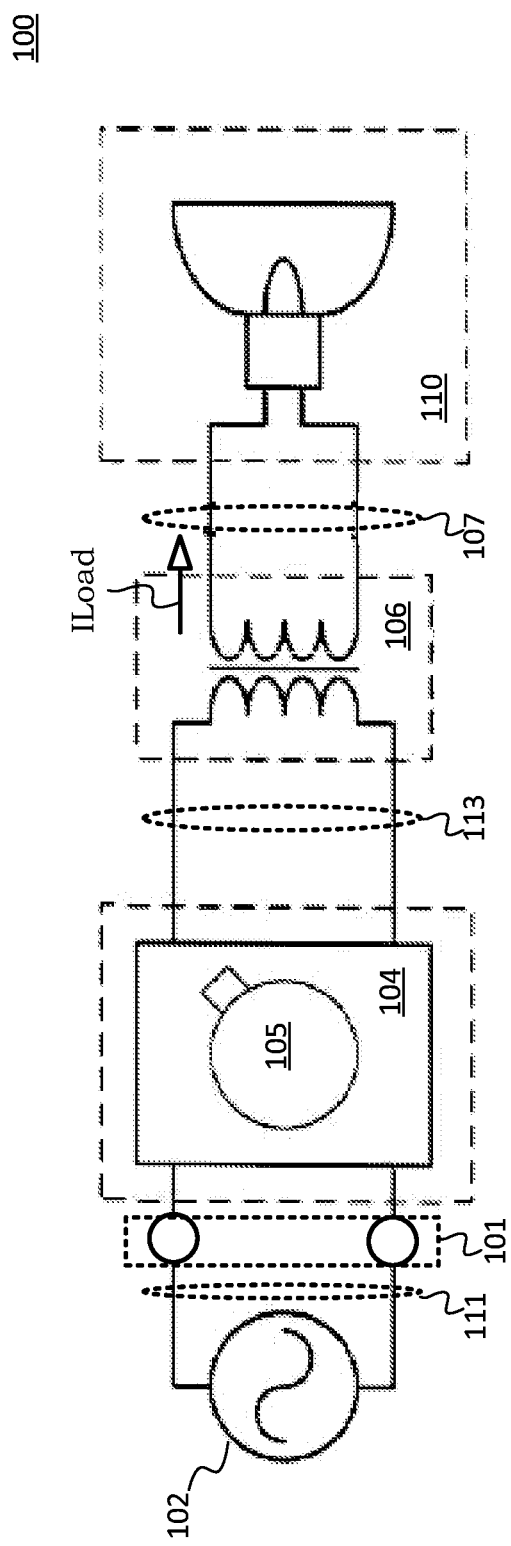
FIG. 1 illustrates selected elements of a low-voltage lighting system.

Turning now to the drawings, FIG. 1 illustrates a low-voltage lighting system 100 that includes a voltage supply 102, a dimmer 104, a transformer 106, and a low-voltage lamp 110. Voltage supply 102 provides a supply voltage 111 to input terminals 101 of dimmer 104. Voltage supply 102 may comprise a mains supply that provides a mains line voltage, for example, a 120 V/60 Hz line voltage or a 230 V/50 Hz line voltage.

Dimmer 104 may comprise any system, device, or apparatus for providing a dimmer signal to other elements of lighting system 100. The dimmer signal represents a dimming level that causes lighting system 100 to adjust power delivered to low-voltage lamp 110, and, thus, depending on the dimming level, increase or decrease the brightness of lamp 110. Dimmer 104 may include a leading-edge dimmer, a trailing-edge dimmer, or any other suitable dimmer. The dimmer 104 illustrated in FIG. 1 provides dimmer signal 113 to transformer 106.

The dimmer 104 illustrated in FIG. 1 includes a dimmer control 105 configured to control an average power of dimmer signal 113. Dimmer control 105 may be a user-positionable slide, dial, or another suitable control mechanism. The positioning of the dimmer control 105 may determine a root mean square (RMS) voltage of dimmer signal 113 to control a brightness of low-voltage lamp 110. Although the lighting system 100 illustrated in FIG. 1 includes a dimmer 104, other embodiments of lighting system 100 may omit dimmer 104, in which case supply voltage 111 is provided directly to transformer 106.

Transformer 106 may comprise any system, device, or apparatus for transferring energy by inductive coupling between winding circuits of transformer 106. Thus, transformer 106 may include a magnetic transformer, an electronic transformer, or any other suitable transformer. The transformer 106 of the lighting system 100 illustrated in FIG. 1 may be a step down transformer that receives dimmer signal 113 and generates a transformer output signal 107 suitable for operating low-voltage lamp 110. In embodiments for use with a 120 V, 60 Hz supply signal 111, transformer 106 may be, for example, a ten-to-one (10:1) step down transformer producing a transformer output signal 107 having a direct current (DC) or RMS voltage of 12 V or less. Similarly, for embodiments employing a 230 V, 50 Hz supply signal 111, transformer 106 may be a twenty-to-one (20:1) step down transformer producing a transformer output signal 107 having a DC or RMS voltage of 12 V or less. In still other embodiments, the magnitude of transformer output signal 107 may be greater than or less than 12 V.

Low-voltage lamp 110 may comprise any system, device, or apparatus for converting electrical energy (e.g., delivered by transformer 106) into photonic energy. In some embodiments, low-voltage lamp 110 may comprise a multifaceted reflector form factor (e.g., an MR16 form factor). In these and other embodiments, low-voltage lamp 110 may comprise an LED lamp.

Although electronic transformers and magnetic transformers may both generate low-voltage signals suitable for powering low-voltage lamp 110, differences between the two types of transformers may impact operation of low-voltage lamp 110. Some electronic transformers may become unstable if the current drawn from transformer 106 drops below a threshold value. For example, an electronic transformer that includes a self-oscillating circuit may become unstable if the current drawn by low-voltage lamp 110 drops below a threshold current, referred to herein as the oscillation current, required for the electronic transformer to maintain self-oscillation.

Figure 2:
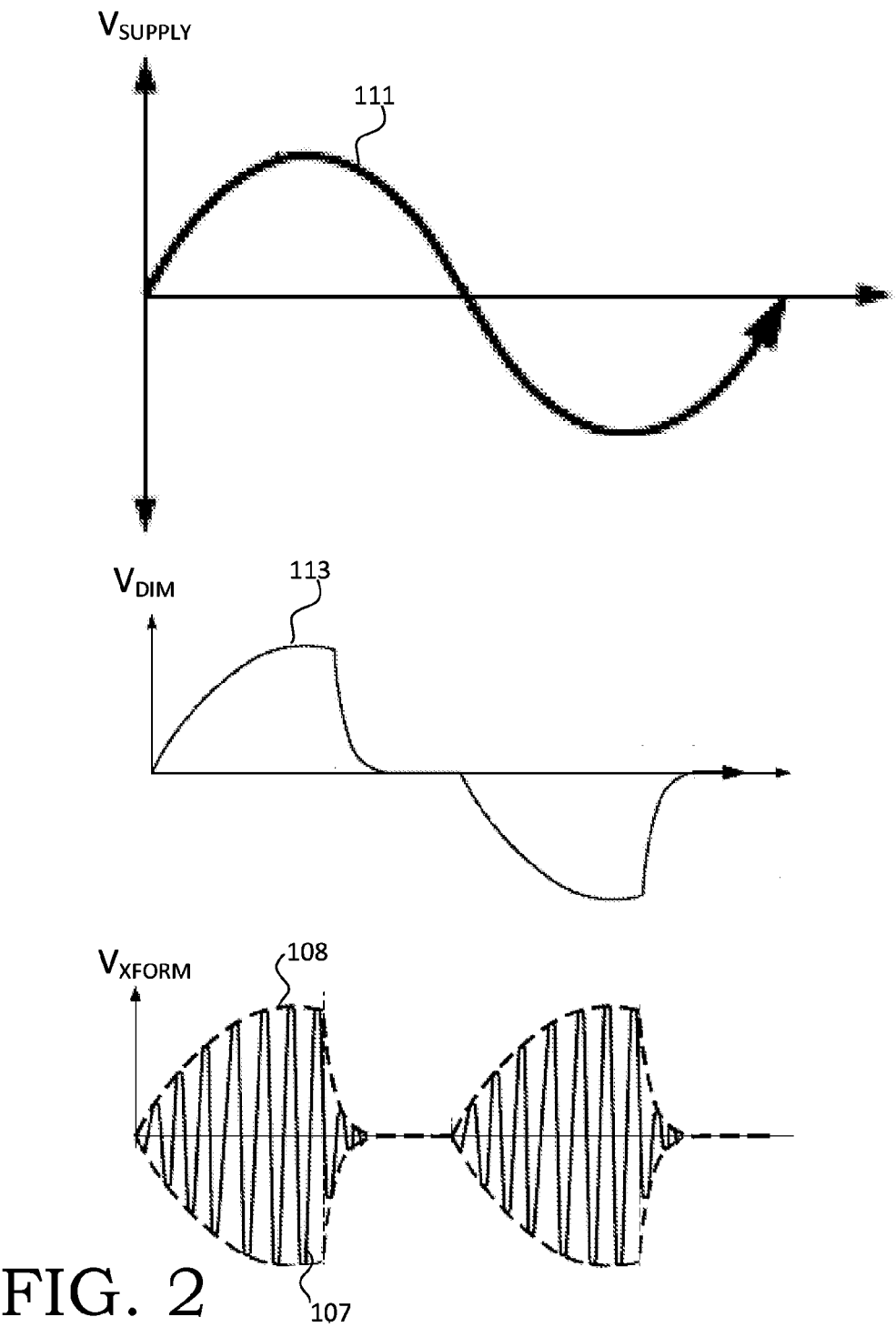
FIG. 2 illustrates waveforms for the circuit of FIG. 1.

Referring now to FIG. 2, example voltage waveforms illustrate aspects of the operation of low-voltage lighting system 100. The voltage supply 102 illustrated in FIG. 1 generates an AC supply voltage $V_{SUPPLY}$ 111. Supply voltage $V_{SUPPLY}$ 111 may be a 120 V/60 Hz signal, a 230 V/50 Hz signal, or a signal of another suitable amplitude and frequency. The dimmer signal $V_{DIM}$ 113 represents the signal generated by the dimmer 104. The dimmer signal $V_{DIM}$ 113 depicted in FIG. 2 illustrates an example of a trailing edge dimmer that reduces the mean power of a signal by effectively zeroing out the signal during the latter portion of each half cycle of supply voltage $V_{SUPPLY}$ 111. The amplitude of dimmer signal $V_{DIM}$ 113 may be approximately equal to the amplitude of supply voltage $V_{SUPPLY}$ 111 and the period of the two signals may be the same. The transformer signal $V_{XFORM}$ 107 represents the output of transformer 106 in the case of an electronic transformer. Transformer signal $V_{XFORM}$ 107 oscillates between positive and negative edges of an envelope voltage 108 at a frequency that is substantially higher than the frequency of envelope voltage 108, dimmer signal $V_{DIM}$ 113, or supply voltage $V_{SUPPLY}$ 111. The amplitude of transformer signal $V_{XFORM}$ 107 may be substantially lower than the amplitudes of dimmer signal $V_{DIM}$ 113 and supply voltage $V_{SUPPLY}$ 111 in embodiments of transformer 106 suitable for use in low-voltage applications.

The presence of a significant high frequency component in transfer signal $V_{XFORM}$ 107 is characteristic of an electronic transformer output signal. The signal generated by a magnetic transformer, in contrast, would resemble the envelope voltage 108 without the high frequency component. Some embodiments of a stabilization circuit illustrated in the following figures beneficially leverage the presence of a high frequency component in the signals generated by electronic transformers to improve the reliable operation of low-voltage lamp 110 (FIG. 1) when used in a lighting system 100 that has an electronic transformer without negatively impacting operation of low-voltage lamp 110 when instead used in a lighting system 100 that includes a magnetic transformer. However those of ordinary skill in the art may recognize a variety of techniques for identifying the source of a transformer output signal as an electronic transformer and other embodiments may incorporate techniques other than those disclosed herein for determining what type of transformer produced and output signal. See, for example, U.S. application Ser. No. 13/799, 328, filed Mar. 13, 2013 entitled "Systems and Methods for Determining a Type of Transformer to Which a Load is Coupled" and U.S. application Ser. No. 14/037,001, filed Sep. 25, 2013, entitled "Systems and Methods for Selecting a Compatibility Mode of Operation for a Lamp Assembly," both of which are commonly owned with the present application by Cirrus Logic, Inc., and both of which are incorporated by reference herein.

Figure 3:
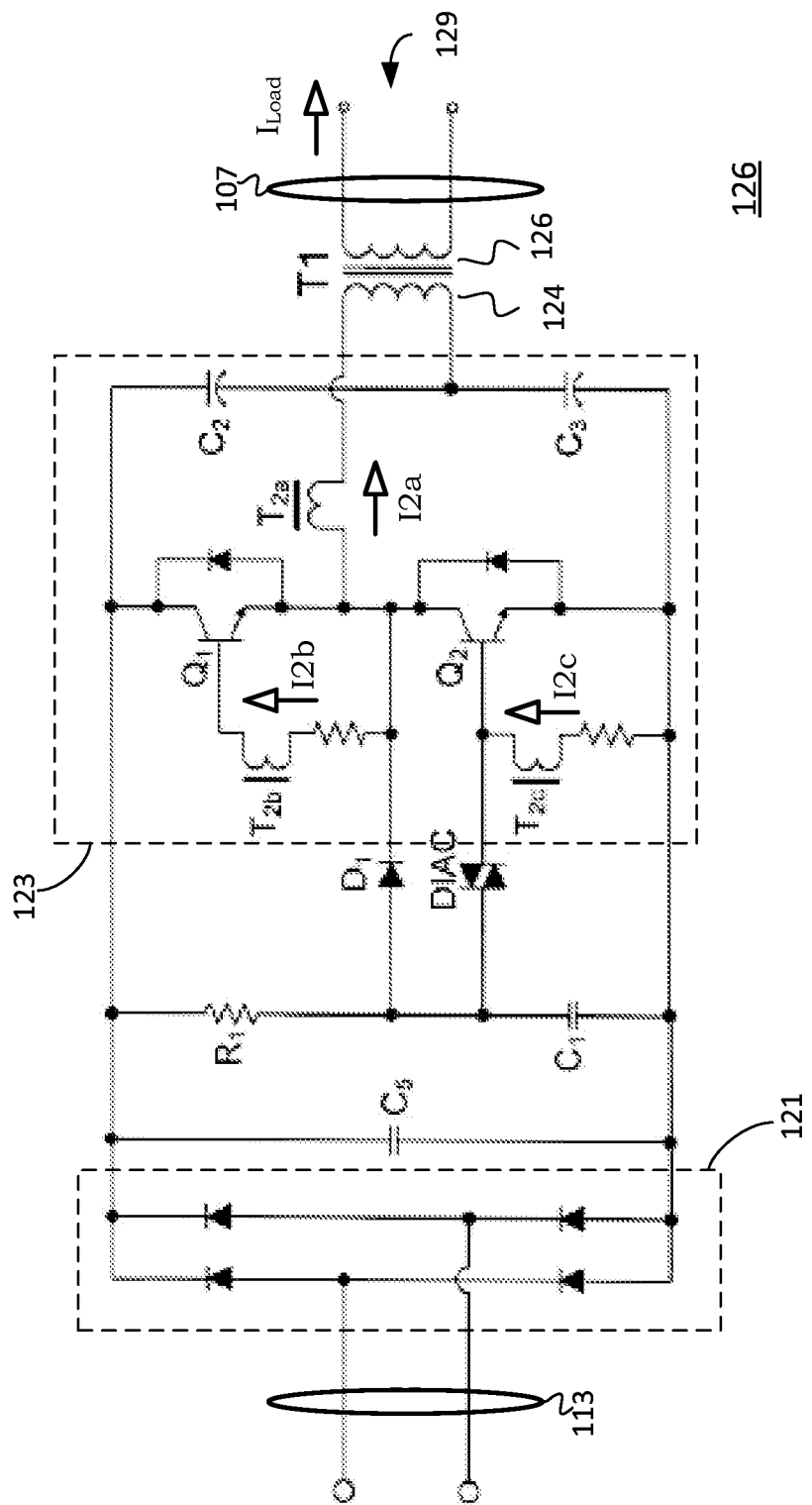
FIG. 3 illustrates selected elements of an electronic transformer suitable for use in an embodiment of the low-voltage lighting system of FIG. 1.

Referring now to FIG. 3, an example electronic transformer 126 is illustrated. The electronic transformer 126 illustrated in FIG. 3 is a self-oscillating transformer that includes a rectification stage 121 and a self-oscillating circuit 123 that includes transistors $Q_1$ and $Q_2$. The self-oscillating circuit 123 illustrated in FIG. 3 comprises an internal transformer that includes an inductive element (not depicted explicitly in FIG. 3) configured with three sets of windings including a first winding $T_{2a}$ that conducts current I2a to an output transformer T1, a second winding $T_{2b}$ that conducts current I2b to the $Q_1$ transistor and a third winding $T_{2c}$ that conducts current provided to an input of transistor $Q_2$. Electronic transformer 126 as shown further includes an output transformer T1 that includes a primary winding 124 configured to receive the output current from $T_{2a}$ and an secondary winding 126 connected to an output port 129 that provides transformer output signal 107.

In some embodiments, self-oscillation of electronic transformer 126 is maintained as long as the load circuit that receives transformer output signal 107 draws a current that exceeds the transformer's oscillation current. If the load circuit does not draw a current that exceeds the oscillation current, electronic transformer 126 may fail to produce transformer output signal 107 reliably. If the load circuit includes a low-voltage lamp, such as low-voltage lamp 110 illustrated in FIG. 1, the transformer output signal 107 may be inconsistent or unstable and low-voltage lamp 110 may flicker, dim, fail to illuminate, or otherwise operate unreliably.

The oscillation current associated with electronic transformer 126 may exceed the current drawn by the load circuit in at least some low-voltage lighting applications. A low-voltage LED lamp, for example, may draw an average current below the oscillation current of at least some commercially distributed electronic transformers. For example, a ten Watt (10 W) low-voltage LED lamp, which produces light approximately equivalent to a 50 W halogen light bulb, may draw approximately 0.8 A (10 W/12 $V_{RMS}$=0.8 $A_{RMS}$) while a suitable electronic transformer may require an oscillation current of 2 A or more.

In at least one embodiment, the low-voltage lamp 110 described in the subsequent figures is suitable for operation with a transformer 106 that is either magnetic or electronic. Low-voltage lamp 110 may include a stabilization circuit that detects or otherwise determines whether the transformer output signal 107 generated by transformer 106 indicates a magnetic transformer or an electronic transformer. The stabilization circuit may further include a switch and a reactive load. The low-voltage lamp 110 may be configured to activate the switch upon detecting a transformer output signal 107 generated by an electronic transformer. The switch may be configured to couple the reactive load to the transformer output. The reactive load may be configured to draw a minimum current needed to ensure that the current drawn from transformer 106 equals or exceeds an oscillation current associated with the electronic transformer. In at least one embodiment, the reactive load may include an inductor or inductive element that is connected across an output port of transformer 106 when the switch is activated. In this manner, low-voltage lamp 110 includes a selectable reactive load that is connected to the transformer output when an electronic transformer is detected. Conversely, low-voltage lamp 110 may de-couple the reactive load when a magnetic transformer is detected.

Figure 4:
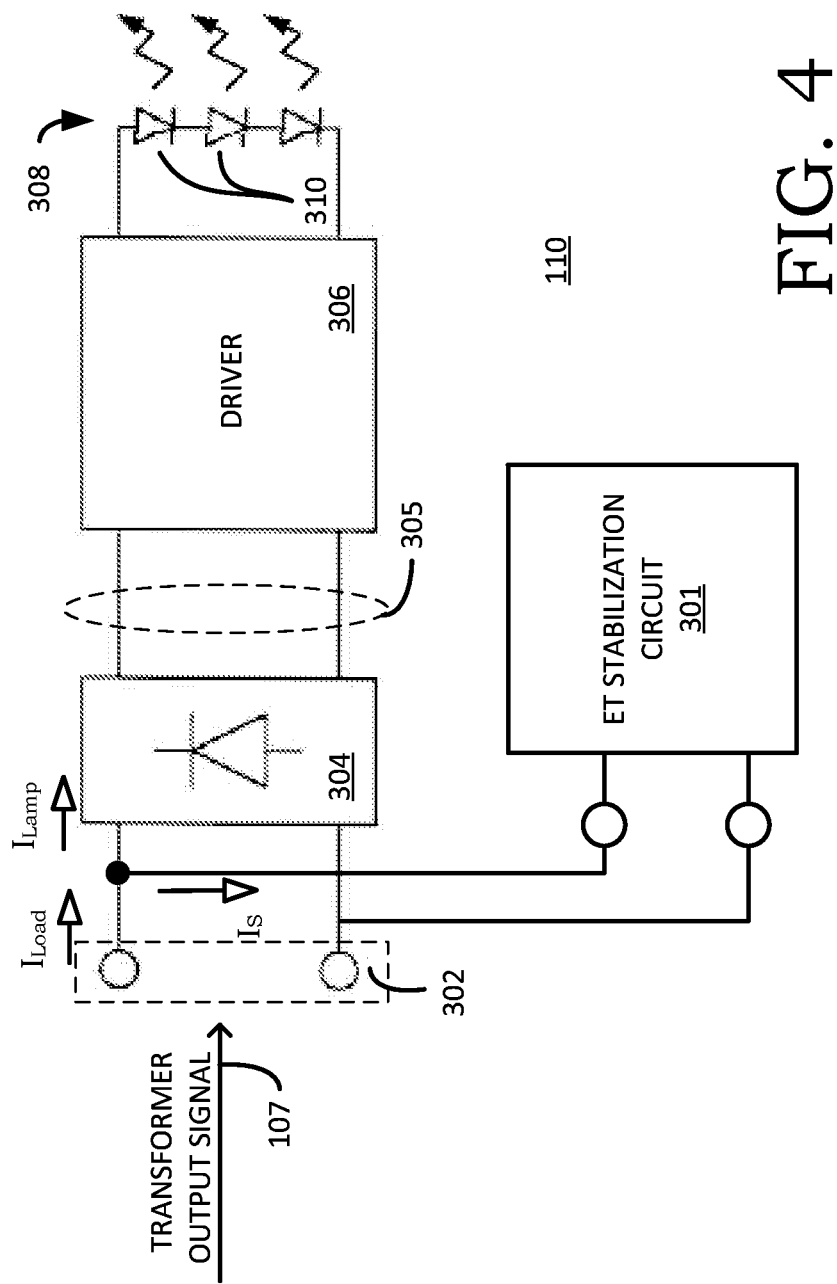
FIG. 4 illustrates a low-voltage lamp including a stabilization circuit.

Turning now to FIG. 4, elements of a low-voltage lamp 110 including an electronic transformer stabilization circuit 301 are illustrated. The low-voltage lamp 110 illustrated in FIG. 4 includes a rectifier 304, a driver 306, a load 308, and stabilization circuit 301. Rectifier 304 and stabilization circuit 301 are connected in parallel across input terminals 302 of low-voltage lamp 110. When low-voltage lamp 110 is connected to a transformer such as the transformer 106 illustrated in FIG. 1, input terminals 302 receives the transformer output signal 107, which is provided to rectifier 304 and to stabilization circuit 301 in parallel.

Rectifier 304 produces a rectified signal 305 that is provided to driver 306. Driver 306 drives the output load 308. In the low-voltage lamp 110 illustrated in FIG. 4, rectifier 304 is or includes a diode bridge rectifier, driver 306 comprises an LED driver, and output load 308 is or includes an LED load of one or more LEDs 310.

The stabilization circuit 301 illustrated in FIG. 4 receives the transformer output signal 107. In at least one embodiment, stabilization circuit 301 is configured to monitor, detect, or otherwise determine whether the transformer is an electronic transformer. The stabilization circuit 301 illustrated in FIG. 4 receives the transformer output signal 107 directly, before rectification by rectifier 304. In other embodiments, stabilization circuit 301 may determine whether the transformer is an electronic transformer based on a signal derived from the transformer output signal 107. For example, other embodiments of stabilization circuit 301 may receive the rectified signal 305 generated by rectifier 304.

The stabilization circuit 301 may be further configured to respond to determining that the transformer output signal 107 was generated by an electronic transformer by coupling a reactive load (not depicted in FIG. 4) across input terminals 302 of low-voltage lamp 110 and, accordingly, across the output of the transformer 106. In at least one embodiment, the reactive load is configured to draw current, referred to herein as the stabilization current $I_S$, from transformer 106 to maintain reliable oscillation of an oscillating circuit in transformer 106 in response to determining that transformer 106 is an electronic transformer.

The reactive load may draw a stabilization current $I_S$ that equals or exceeds the oscillation current of the applicable electronic transformer. If, for example, transformer 106 is an electronic transformer requiring an oscillation current of 2 A, the reactive load provided by stabilization circuit 301 may be configured to draw a minimum stabilization current $I_S$ of 2 A from transformer 106 when the low-voltage lamp 110 is connected to transformer 106. In other embodiments, the reactive load may draw a stabilization current $I_S$ intended to supplement the lamp current $I_{Lamp}$ dissipated in the output load 308 of low-voltage lamp 110 such that the transformer output current, $I_{Load}$, which is equal to the sum of the lamp current $I_{Lamp}$ and the stabilization current $I_S$, equals or exceeds the oscillation current.

While the following figures describe various embodiments of stabilization circuit 301 and low-voltage lamp 110, one of skill in the art may recognize various other techniques for determining whether a transformer output is an electronic transformer output and various techniques for switching or otherwise selectively coupling a circuit into the low-voltage lamp when an electronic transformer signal is detected. The embodiments described herein are exemplary and any variants recognizable to those of skill in the art are equally encompassed.

Figure 5:
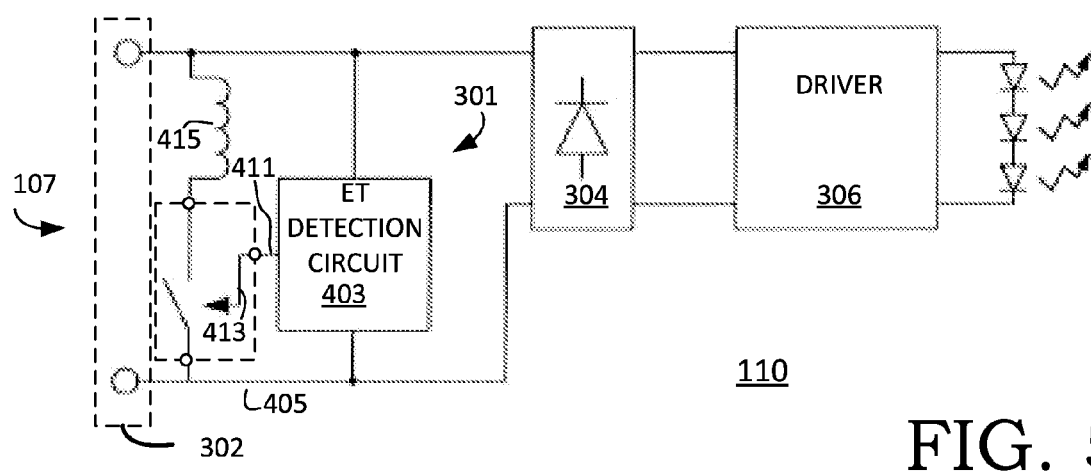
FIG. 5 illustrates elements of the low-voltage lamp of FIG. 4 including an electronic transformer detection circuit.

Turning now to FIG. 5, additional details of an embodiment of the stabilization circuit 301 of FIG. 4 are illustrated. The stabilization circuit 301 illustrated in FIG. 5 includes an electronic transformer detection circuit 403 configured to receive the transformer output signal 107 applied to input terminals 302. The electronic transformer detection circuit 403 generates an output signal 411 that connects to a control terminal 413 of a switch 405. The switch 405 is connected in series with an inductor 415 across input terminals 302. The output signal 411 of electronic transformer detection circuit 403 is shown connected to a control terminal 413 of switch 405.

ET detection circuit 403 may monitor the transformer output signal 107 for high frequency components indicative of a signal generated by an electronic transformer. In at least one embodiment, the electronic transformer detection circuit 403 may include a high pass filter configured to identify a transformer output signal 107 that includes a frequency component having a frequency exceeding a specified threshold frequency, such as 10 kHz or 20 kHz or a transformer output signal 107 that includes a frequency component within a specified frequency band such as, for example, a frequency band from approximately 10 kHz or 20 kHz to approximately 100 kHz or 200 kHz.

When a high frequency component is present in transformer output signal 107, the electronic transformer detection circuit 403 may assert its output signal 411 and close switch 405 to connect inductor 415 across the output of transformer 106 and thereby provide reactive loading that draws a stabilization current sufficient to maintain the transformer output current drawn by low-voltage lamp 110 equal to or greater than the oscillation current of transformer 106. Conversely, in response to detecting no high frequency component in a transformer output signal 107 or in response to otherwise determining or detecting that transformer 106 is not an electronic transformer, at least one embodiment of electronic transformer detection circuit 403 de-asserts output signal 411. De-assertion of output signal 411 de-asserts switch control signal 413 and thereby deactivates switch 405, creating a high impedance or open circuit that prevents current from flowing through inductor 415.

The reactive load, when connected to the transformer output, draws a stabilization current that beneficially increases the current output by transformer 106 and thereby beneficially reduces the likelihood of transformer 106 faltering from a lack of oscillating current. Moreover, because the stabilization current associated with an inductor, such as inductor 415, is a reactive current, the likelihood of transformer 106 failing to output a load current that is less than the oscillation current is decreased with a relatively small increase in power consumption.

Figure 6:
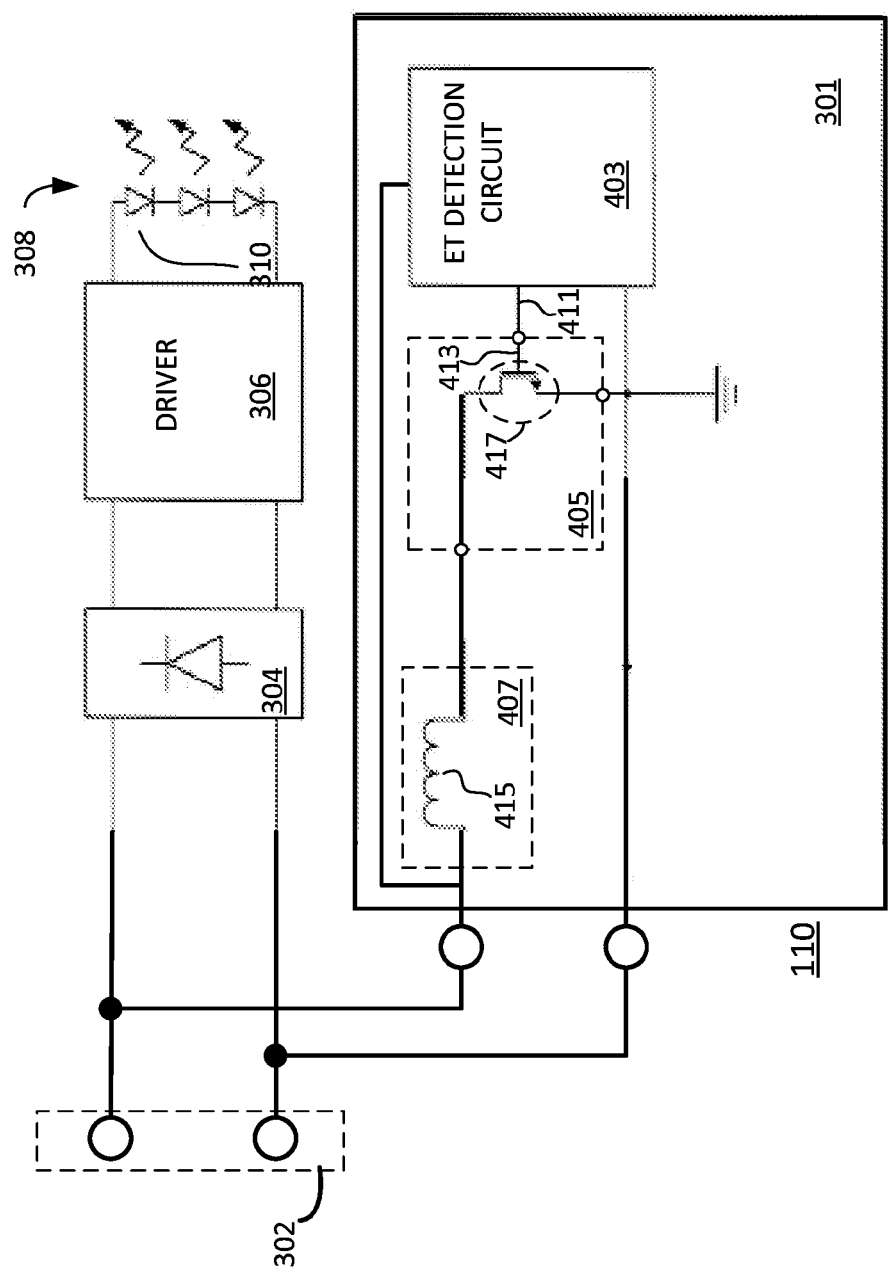
FIG. 6 illustrates additional detail of the low-voltage lamp in FIG. 5.

Referring now to FIG. 6, additional details of an embodiment of the stabilization circuit 301 of FIG. 5 are shown. As illustrated in FIG. 6, the switch 405 is implemented as a solid state switch including a transistor 417, which may be either a bipolar transistor or an MOS transistor. For embodiments that employ a MOSFET transistor, the control terminal 413 may be the gate terminal of the metal-oxide-semiconductor field effect transistor (MOSFET) transistor and the inductor 415 is connected to the transistor's source or drain. For embodiments that employ a bipolar transistor as switch 405, the control terminal 413 may be a base terminal of the bipolar transistor and the inductor 415 is connected to the transistor's emitter or collector. While FIG. 6 illustrates an embodiment in which a single transistor is used as the switch 405, those of skill in the art will recognize that alternatives for providing a switch function may be employed in the stabilization circuit 301.

Figure 7:
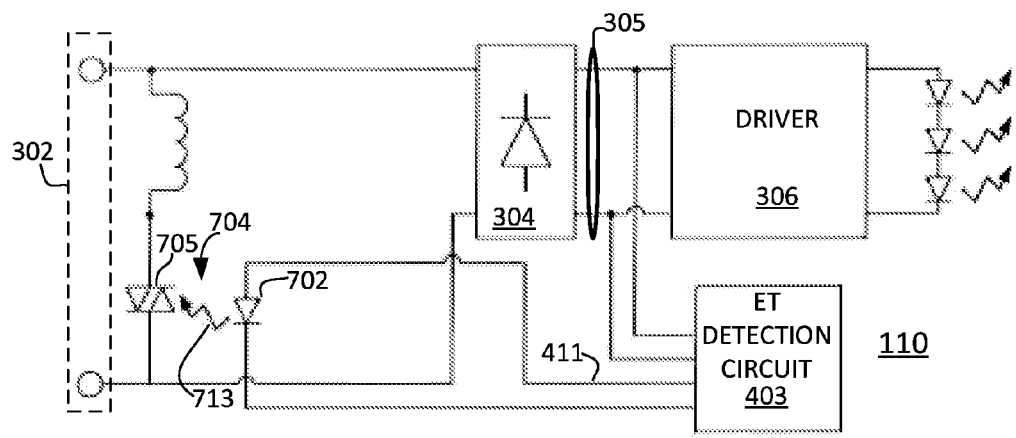
FIG. 7 illustrates an embodiment of a low-voltage lamp including a stabilization circuit.

Turning now to FIG. 7, electronic transformer detection circuit 403 is illustrated producing an output signal 411 that drives an opto-coupled switch 704. As depicted in FIG. 7, electronic transformer detection circuit 403 uses the rectified output signal 305 generated by rectifier 304 as the input from which it determines whether the transformer is an electronic transformer. Responsive to detecting a high frequency component in the rectified signal 305, electronic transformer detection circuit 403 asserts output signal 411 to drive current through LED 702. Optical energy in the form of light 713 produced by LED 702 activates an optically triggered triac 705, which is located in proximity to LED 702, to close opto-couple switch 704 and thereby connect inductor 415 across input terminals 302.

Although the electronic transformer detection circuit 403 illustrated in FIG. 7 operates on a rectified form of transformer output signal 106, the circuit may be configured to operate on the transformer output signal 107 directly. In addition, the use of an opto-coupled switch is an exemplary embodiment and other embodiments, including the transistor switch embodiments described herein, will be recognized by those of skill in the art.

Figure 8:
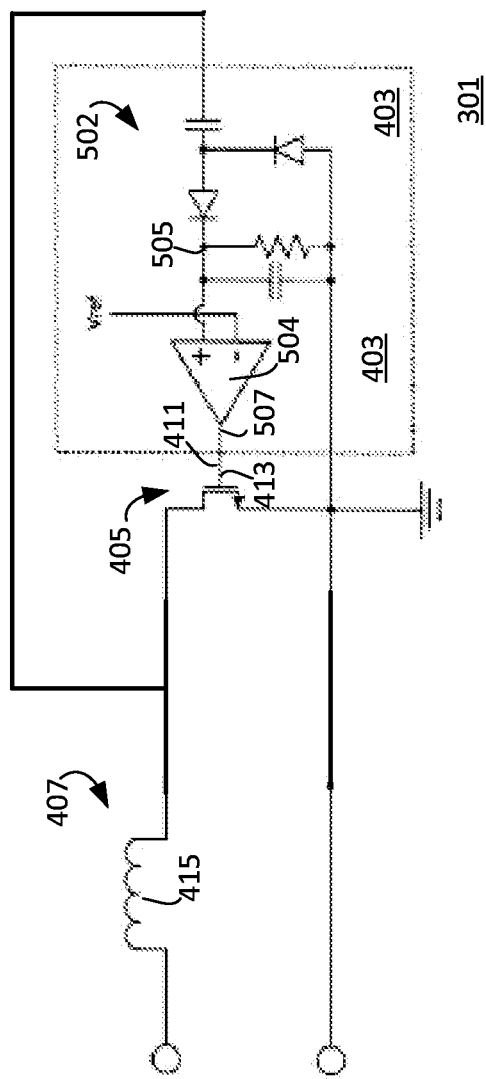
FIG. 8 illustrates selected detail of an electronic transformer detection circuit.

Turning now to FIG. 8, an embodiment of stabilization circuit 301 is shown with additional detail for an example electronic transformer detection circuit 403. The electronic transformer detection circuit 403 illustrated in FIG. 8 includes passive elements configured to function as a high pass filter 502 providing a first input to a comparator 504 that receives a reference voltage Vref as its second input. The impedance of high pass filter 502 decreases within increasing signal frequency. For a high frequency signal, indicative of an electronic transformer, a node 505 connected to the positive input terminal of comparator 504 is grounded or close to ground and is more positive than the negative input terminal of comparator 504, which is connected to Vref. Because a voltage of the positive terminal of comparator 504 is more positive than Vref, comparator 504 asserts its output terminal 507, which is connected to electronic transformer detection circuit output signal 411 and the control terminal 413 of switch 405.

For a transformer output signal 107 having no high frequency components including, for example, a low-voltage supply signal generated by a magnetic transformer, the voltage at node 505 drops approximately two diode drops below ground and is more negative than Vref. With its positive terminal more negative than its negative terminal, comparator 504 de-asserts its output signal 507, thereby de-asserting the control terminal 413 of switch 405 and effectively causing the switch 405 to disconnect the inductor 415 from the input port 320. By proper selection of Vref and the passive components of high pass filter 502, comparator 504 may be configured to assert its output signal 507 and turn on switch 405 if the transformer output signal 107 from transformer 106 has any frequency components above a threshold frequency.

While a particular implementation of a high pass filter is illustrated in FIG. 8, those of skill in the art will recognize other circuits and techniques for determining whether a signal includes a high frequency component. Similarly, those of skill will recognize that identifying a transformer as an electronic transformer may involve techniques that do not rely on a frequency filter.

Figure 9:
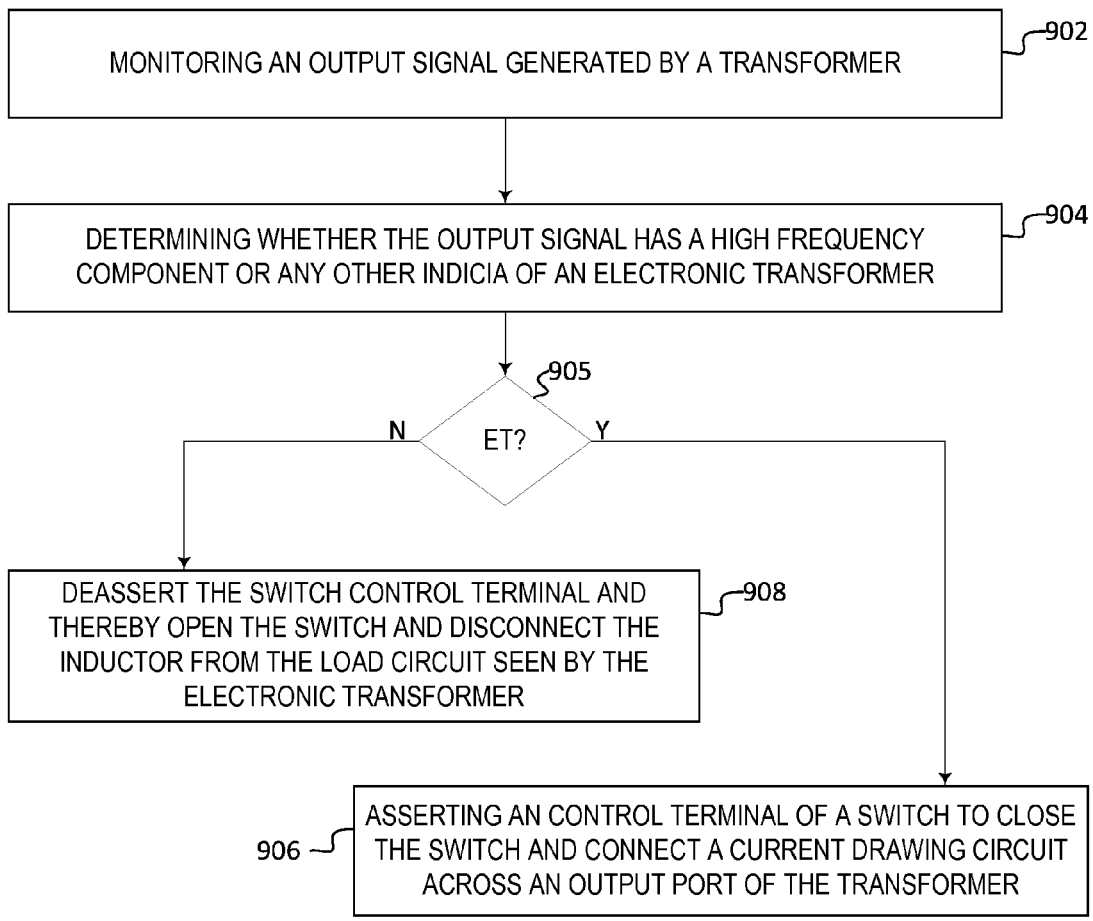
FIG. 9 illustrates a method of operating a low-voltage lamp that includes an electronic transformer stabilization circuit.

Turning now to FIG. 9, a flow diagram illustrates a method 900 of generating light from a low-voltage supply signal provided to a low-voltage lamp. Method 900 may be representative of a method performed by the stabilization circuit 301 of low-voltage lamp 110, the electronic transformer detection circuit 403, or both. Method 900 may include monitoring (block 902) an output signal generated by a transformer and determining (block 904) whether the output signal has a high frequency component or any other indicia of an electronic transformer. If the electronic transformer detection circuit determines (block 905) that the transformer output is generated by an electronic transformer, the electronic transformer detection circuit asserts (block 906) a control terminal of a switch. The assertion of the switch control terminal may cause the switch to close. The closing of the switch may then connect an inductor or another suitable reactive load across input terminal of the low-voltage light bulb so that the inductor is connected across the electronic transformer output. Conversely, if the transformer output signal does not include a high frequency component, suggesting that the transformer output signal is generated by a magnetic transformer rather than an electronic transform, method 900 may deassert (block 908) the switch control terminal and thereby open the switch and disconnect the inductor from the load circuit seen by the transformer.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. A stabilization apparatus, comprising:
   a reactive load configured to draw a stabilization current from a transformer output;
   a detection circuit configured to:
      monitor a transformer signal indicative of the transformer output for a predetermined condition; and
      couple the reactive load to the transformer output responsive to detecting the predetermined condition.

2. The stabilization apparatus of claim 1, further comprising:
   a bridge rectifier configured to generate a rectified signal from the transformer output;
   wherein the transformer signal is selected from a group consisting of:
      the transformer output; and
      the rectified signal.

3. The stabilization apparatus of claim 2, further comprising:
   a driver configured to receive the rectified signal and produce a direct current load signal; and
   a load circuit configured to receive the load signal from the driver.

4. The stabilization apparatus of claim 2, wherein the load circuit comprises a light producing load circuit.

5. The stabilization apparatus of claim 4, wherein the light producing load circuit includes a light emitting diode configured to receive the load signal.

6. The stabilization apparatus of claim 1, wherein the predetermined condition is indicative of whether an electronic transformer provided the transformer output.

7. The stabilization apparatus of claim 1, wherein the predetermined condition is indicative of whether the transformer output includes a component selected from the group consisting of:
- a component having a frequency exceeding a specified threshold frequency; and
- a component having a frequency within a specified frequency band.

8. The stabilization apparatus of claim 1, wherein the reactive load includes:
- an inductor; and
- a semiconductor switch configured to provide a current path for inductor current.

9. The stabilization apparatus of claim 8, wherein the switch comprises an opto-coupled triac.

10. A circuit stabilization method, comprising:
- monitoring a transformer for a characteristic indicative of an electronic transformer;
- responsive to detecting the characteristic, coupling a reactive load to the transformer; and
- responsive to not detecting the characteristic, decoupling the reactive load from the transformer.

11. The circuit stabilization method of claim 10, wherein monitoring the transformer comprises monitoring a transformer signal indicative of a transformer output generated by the transformer.

12. The circuit stabilization method of claim 11, wherein the characteristic comprises a component of the transformer signal having a frequency exceeding a predetermined minimum.

13. The circuit stabilization method of claim 12, further comprising:
- rectifying the transformer output with a bridge rectifier to produce a rectified signal.

14. The circuit stabilization method of 13, wherein the transformer signal comprises the rectified signal.

15. The circuit stabilization method of 13, wherein the transformer signal comprises the transformer output.

16. The circuit stabilization method of claim 10, wherein the reactive load comprises an inductor configured to draw a minimum peak current from the transformer.

17. The circuit stabilization method of claim 16, wherein:
- the inductor comprises an inductor of a low voltage lamp including a light emitting load including a light emitting diode;
- the monitoring comprising monitoring, by the low voltage lamp; and
- the coupling of the reactive load comprises coupling the inductor in parallel with an output of the transformer.

18. An apparatus, comprising:
- an inductor;
- a switch configured to respond to a detection signal by coupling the inductor to an output of a transformer;
- a bridge rectifier configured to generate a rectified signal in accordance with a transformer output of the transformer; and
- a detection circuit configured to generate the detection signal responsive to detecting, in a transformer signal, a frequency component having a frequency exceeding a threshold frequency.

19. The apparatus of claim 18, wherein the transformer signal comprises the transformer output.

20. The apparatus of claim 18, wherein the transformer signal comprises the rectified signal.

21. The apparatus of claim 18, further comprising:
- a light emitting load; and
- a driver configured to receive the rectified signal and drive the light emitting load.

22. The apparatus of claim 21, wherein the light emitting load comprises light emitting diode.

* * * * *